United States Patent
Gorr et al.

(10) Patent No.: US 8,438,717 B2
(45) Date of Patent: May 14, 2013

(54) METHOD FOR TOLERANCE COMPENSATION BETWEEN TWO COMPONENTS AND A TOOL FOR EXECUTION OF THE METHOD

(75) Inventors: Eugen Gorr, Hamburg (DE); Rolf Bense, Jork (DE)

(73) Assignee: Airbus Operations GmbH, Hamburg (DE)

( * ) Notice: Subject to any disclaimer, the term of this patent is extended or adjusted under 35 U.S.C. 154(b) by 469 days.

(21) Appl. No.: 12/729,392

(22) Filed: Mar. 23, 2010

(65) Prior Publication Data

US 2010/0242256 A1    Sep. 30, 2010

(51) Int. Cl.
*B23P 17/00* (2006.01)
*B29C 45/22* (2006.01)

(52) U.S. Cl.
USPC .......................................... 29/527.1; 425/570

(58) Field of Classification Search ................. 29/527.1, 29/428, 458, 432, 897; 425/570, 174, 129.1; 156/285; 264/459
See application file for complete search history.

(56) References Cited

U.S. PATENT DOCUMENTS

| | | | |
|---|---|---|---|
| 4,980,005 A | | 12/1990 | Scollard |
| 5,885,513 A | * | 3/1999 | Louderback et al. .......... 264/459 |
| 2006/0060705 A1 | | 3/2006 | Stulc et al. |
| 2006/0162859 A1 | * | 7/2006 | Pridie ............................ 156/285 |

FOREIGN PATENT DOCUMENTS

| | | |
|---|---|---|
| DE | 727196 C | 10/1942 |
| EP | 0810344 B1 | 7/2002 |

* cited by examiner

*Primary Examiner* — John C Hong
(74) *Attorney, Agent, or Firm* — Leydig, Voit & Mayer, Ltd.

(57) ABSTRACT

A method for tolerance compensation in an overlap joint between a first and a second body section of adjacent fuselage rings includes introducing a plurality of holes into a first body section corresponding to a pattern of rivets; arranging the first and second body section in an overlapping configuration so as to form an overlap; injecting a filler mass through the plurality of holes into a gap formed in the overlap; and hardening the filler mass.

17 Claims, 2 Drawing Sheets

METHOD FOR TOLERANCE COMPENSATION BETWEEN TWO COMPONENTS AND A TOOL FOR EXECUTION OF THE METHOD

Priority is claimed to German Application No. DE 10 2009 014 933.3, filed Mar. 25, 2009, and U.S. Provisional Application No. 61/163,052, filed Mar. 25, 2009. The entire disclosure of both applications is incorporated by reference herein.

The invention concerns a method for tolerance compensation between two components and a tool for execution of the method.

BACKGROUND

From the German patent document DE 727 196 it has for a long time been of known art to form aircraft fuselages from a large number of fuselage rings. Adjacent fuselage rings are joined with one another in the transverse joint region and with their edge sections thereby form a riveted overlap joint. As a result of manufacturing and component tolerances between the overlapping edge sections a radial gap can occur, at least in some sections. In fuselages of metal construction these gaps can be closed by an appropriate deformation of the edge sections during riveting.

The gaps are particularly problematic, however, in the case of carbon fibre reinforced fuselages (CFRP fuselages) since these can hardly be deformed at all. Component tolerances are thus compensated for by a filler mass in the gaps. Accurate metering and positioning of the filler mass is, however, very difficult as a result of limited accessibility, since in the manufacture of an overlap joint in particular the filler mass can flow out or be displaced as a result of shear forces during the assembly process.

Alternatively US 2006/0060705 A1 envisages positioning CFRP fuselage rings side-by-side and riveting their adjacent edge sections together by means of a transverse joint tab. However even in this solution of known art accurate metering and positioning of the filler mass is critical.

SUMMARY OF THE INVENTION

An aspect the present invention is to create a method for tolerance compensation in an overlap joint between two body sections of adjacent components, which avoids the disadvantages cited above and allows accurate metering and positioning of the filler mass, as well as a tool for the execution of the method.

A method according to the invention for tolerance compensation between two body sections of adjacent fuselage rings envisages the introduction of a multiplicity of holes into the one body section, wherein the arrangement of the holes, i.e. the pattern of holes thus formed, corresponds to a subsequent pattern of rivets. The body sections are then brought into an overlapping configuration, wherein as a result of tolerance differences a gap occurs between the body sections, at least in some sections. As soon as the overlapping configuration is created a filler mass is injected into the gap via the holes. After the filler mass has hardened the two body sections are joined together and an overlap joint is thus formed.

In the method according to the invention it is advantageous if the filler mass can fill the gap in an accurately metered and positioned manner. Excess filler mass is pushed out of the gap such that the filling of the gap can be terminated. Thus no wastage of the filler mass occurs. Furthermore it is ensured that the gap in question is adequately filled with the filler mass and that no voids are formed. Furthermore the filler mass is compressed during injection such that in the hardened state the filler mass has a uniform structure.

The filler mass is injected via a tool, which closes off the holes that it covers such that the filler mass cannot exit from these holes.

Injection of the filler mass preferably takes place through a plurality of holes at the same time.

To prevent the filler mass from exiting through an axial gap between the two components the gap can be closed off with a porous-to-air adhesive tape. Likewise a radial gap can be closed off on the end face by a porous-to-air adhesive tape.

A tool according to the invention for tolerance compensation between two components has at least one injection nozzle for the injection of a filler mass via a hole into a gap, wherein the injection nozzle can be introduced into the hole in a sealing manner and wherein the injection nozzle can have an elastic rubber nozzle tip to improve the sealing action and wherein the nozzle tip has a radial taper on its inner circumference for increasing the pressure as the filler mass exits and the hole is additionally sealed.

An advantage of the tool according to the invention is that the filler mass cannot exit through the hole into which the injection nozzle is inserted. By this means the loss in particular of filler mass in the working environment is prevented.

A multiplicity of injection nozzles is preferably provided, the arrangement of which corresponds to a hole pattern in one body section of the one component.

In the case of a multiplicity of injection nozzles the injection nozzles can be moved relative to another to compensate for the tolerances between the hole pattern and the arrangement of the injection nozzles. This can occur in particular either by means of a design of the tool that is elastic at least in the region of the injection nozzles, or by means of an elastic design of the injection nozzles.

BRIEF DESCRIPTION OF THE DRAWINGS

In what follows preferred examples of embodiment of the invention are elucidated in more detail with the aid of schematic representations. In the figures.

DETAILED DESCRIPTION

Figure 1:
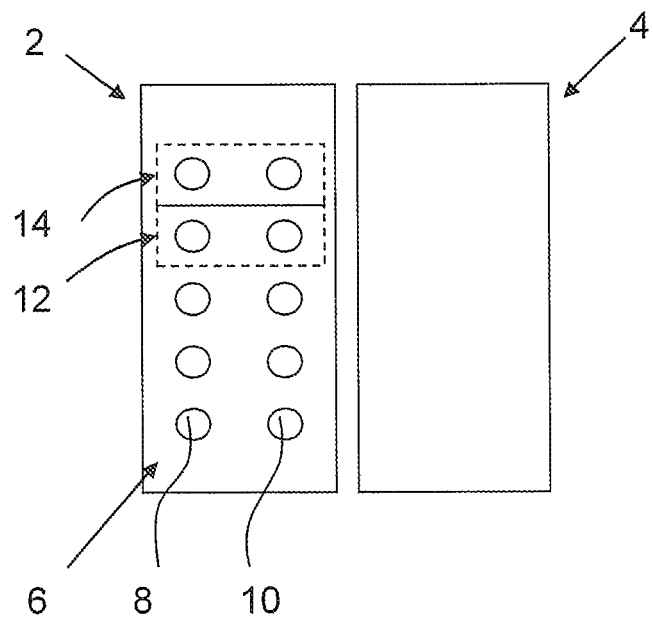
FIG. 1 shows a plan view onto adjacent body sections of two components arranged side by side.

FIG. 1 shows a plan view onto two body sections 2, 4 of adjacent components. The components can for example be carbon fibre-reinforced fuselage rings (CFRP fuselage rings), which are to be joined together in the transverse joint region by means of an overlap joint for purposes of creating an aircraft fuselage. The body sections 2, 4 are designed as a radially outer-lying edge section 2 and a radially inner-lying edge section 4.

In the radially outer-lying edge section 2 a region is designed with a circumferential pattern of holes 6 with a multiplicity of holes 8, 10. The pattern of holes 6 corresponds to a pattern of rivets that is formed during the riveting together of the two edge sections 2, 4. Thus recourse can be made to existing hole templates for the creation of the pattern of holes 6. The holes 8, 10 are arranged side-by-side in the axial direction and the circumferential direction. Two holes 8, 10, side-by-side in the axial direction, in each case form a hole pair 12, 14.

Figure 2:
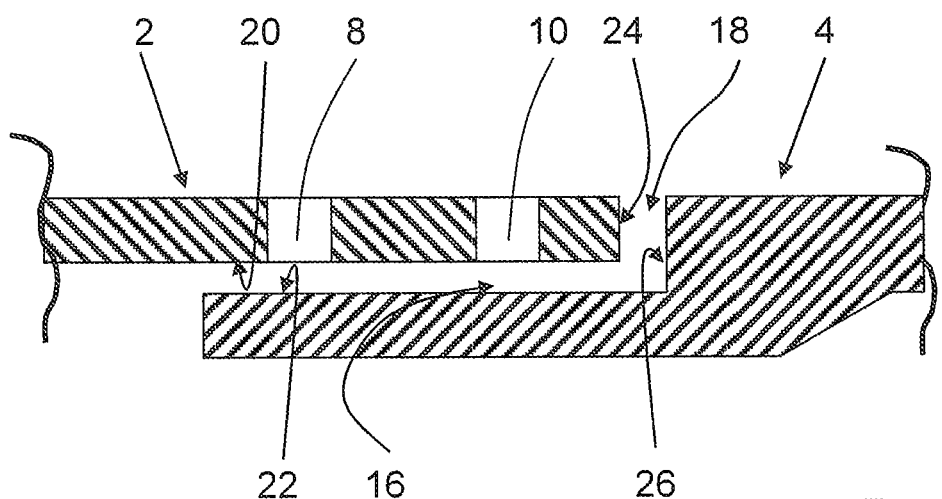
FIG. 2 shows a cross-section through the body sections of FIG. 1 in an overlapping configuration.

In accordance with FIG. 2 a radial gap 16 and an axial gap 18 are formed between the edge sections 2, 4 during the creation of the overlap joint. The gaps 16, 18 are operatively connected with one another, wherein in particular the radial gap 16 occurs as a result of manufacturing, i.e. component tolerances of the components.

The tolerance compensation takes place by means of a filler mass, not represented, which is injected via the holes 8, 10 into the gaps 16, 18.

The filler mass is a conventional fluid composite material such as, for example, a fluid shimming material, or an adhesive.

In the region facing away from the axial gap 18 the radial gap 16 is open on its end face. Depending on the tolerances to be compensated for the radial gap 16 is an annular type of single gap, or consists of a plurality of gaps separated from one another. It is bounded by an inner circumferential surface 20 of the outer-lying edge section 2 and by an opposing outer circumferential surface 22 of the inner-lying edge section 4. The holes 8, 10 pass through the outer-lying edge section 2 radially and thus open out into the radial gap 16.

The inner-lying edge section 4 is generated by means of an offset, i.e. a step. The outer circumferential surface 22 of the inner-lying edge section 4 is designed to be closed and no holes pass through it.

The axial gap 18 is bounded by opposing annular surfaces 24, 26 of the edge sections 2, 4. It is open outwards on its circumferential face.

Figure 3:
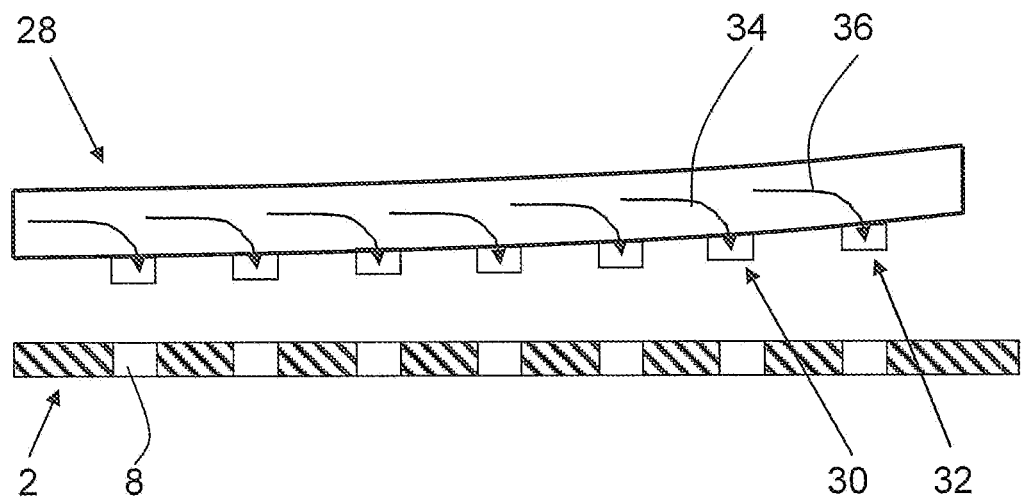
FIG. 3 shows a cross-section through one of the body sections of FIG. 1 and through a tool according to the invention.

FIG. 3 shows a cross-section through the outer-lying edge section 2 in the region of its holes 8, arranged side-by-side in the circumferential direction. Furthermore the figure shows a cross-section through a tool 28 according to the invention for the injection of the filler mass.

Figure 4:
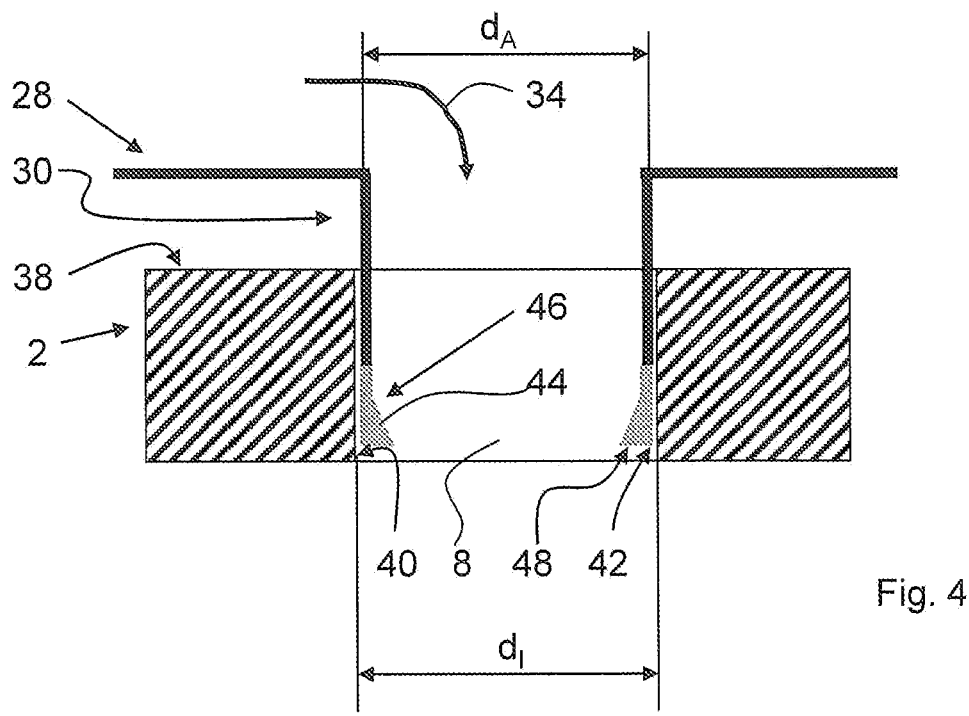
FIG. 4 shows a cross-section through an injection nozzle of the tool as per FIG. 3 that has been inserted into a hole.

The tool 28 has a multiplicity of injection nozzles 30, 32, which are arranged in accordance with the hole pattern 6 shown in FIG. 1. The injection nozzles 30, 32 project out of the tool 28 and in operation are inserted into the respective holes 8, 10 in a section-by-section manner, as shown in FIG. 4. The tool 28 is designed in an elastic manner, so that the individual injection nozzles 30, 32 can be moved relative to one another. By this means tolerances between the hole pattern 6 and the injection nozzles 30, 32 can be compensated for, and the introduction of the injection nozzles 30, 32 into the respective holes 8, 10 is made easier.

The flow direction of the filler mass through the tool 28 and into the injection nozzles 30, 32 is indicated by the arrows 34, 36 in FIG. 3.

FIG. 4 shows a cross-section through the edge section 2 in the region of the hole 8 with a tool 28 in position. In accordance with the representation in the figure the tool 28 in operation is positioned at a distance from the opposing outer circumference 38 of the outer-lying edge section 2. Just the injection nozzle 30 is inserted section-by-section into the holes 8. This is true, needless to say, for all holes 8, 10 and all injection nozzles 30, 32, as is the following elucidation.

To ease the insertion of the injection nozzle 30 into the hole 8, the outer diameter $d_A$ of the injection nozzle 30 is smaller than the inner diameter $d_I$ of the hole 8. Thus in the inserted state an annular gap 42 is formed between the inserted section of the injection nozzle 30 and the inner circumference 40 of the hole 8.

In the region in which it opens out into the radial gap 16 the injection nozzle 30 has an elastic rubber nozzle tip 44. The nozzle tip 44 is made of a softer material than the rest of the injection nozzle 30. During injection of the filler mass in accordance with the flow direction 34 represented in FIG. 4 the nozzle tip 44 is radially widened; it closes the annular gap 42 and is positioned in a sealing manner against the inner circumference 40 of the hole 8.

To improve the sealing action the nozzle tip 44 has a radial taper on its inner circumferential face. The taper 46 is of conical design and during injection of the filler mass produces a pressure rise in the nozzle tip 42; as a result the latter widens further and is pressed with a greater force against the inner circumference 40 of the hole 8.

The conical taper 46 has an annular end face 48 facing towards the radial gap 16. In the case in which the injection nozzle is not in operation and the filler mass is being injected via an adjacent hole 8, as a result of the filler mass flowing against the end face 48 the latter also causes a widening of the nozzle tip 44 and thus the formation of a seal against the inner circumference 40 of the hole 8. The annular gap 42 is closed and thus the filler mass cannot exit via the holes 8 that are not in operation. Thus the holes 8, 10 are sealed closed, independently of the activation of the injection nozzles 30.

In a method according to the invention a hole pattern 6 is introduced into the radially outer-lying edge section 2. The two edge sections 2, 4 of the adjacent components are then brought together in an overlapping configuration. The axial gap 18 on the circumferential face and the radial gap 16 on the end face are then covered with a porous-to-air adhesive tape, so that during the injection of the filler mass through the holes 8, 10 the air can exit from the gaps 16, 18 and no air inclusions, i.e. voids, can form in the gaps 16, 18. The tool 28 is positioned on a region of the hole pattern 6 such that the injection nozzles 30, 32 insert into the opposing holes 8, 10. The tool 28 is actuated and the filler mass is injected via the injection nozzles 30, 32 into the radial gap 16 and the axial gap 18. The control of the tool 28 preferably takes place such that the filler mass is injected in each case via an axial pair of holes 12 into the gaps 16, 18. As soon as the gaps 16, 18 have been closed up in the region of this pair of holes 12 and the filler mass is exiting from the gaps 16, 18, the supply of filler mass is interrupted and filler mass is injected into the gaps 16, 18 via the circumferentially adjacent axial pair of holes 14. After the filler mass has been injected into this region of the hole pattern 6 through all injection nozzles 30, 32 of the tool 28, the tool 28 is positioned on the adjoining region of the hole pattern 6 and the injection of the filler mass begins again, until the filler mass has been injected into the radial gap 16 and the axial gap 18 over the complete hole pattern 6 and thus over the complete circumference of the outer-lying edge section 2. After hardening of the filler mass the edge sections 2, 4 are prepared for riveting in a manner of known art, are riveted together, and thus the overlap joint is formed. Here by virtue of the hardened filler mass no swarf can accumulate between the edge sections during the drilling of the rivet holes.

After hardening the filler mass has accumulated in the regions of the edge sections 2, 4, in which manufacturing, i.e. component, tolerances were present between the components, so that in the following creation of the overlap joint, in the riveting together of the edge sections 2, 4, for example, the latter are not deformed, and thus no disadvantageous stresses are introduced into the components.

It should be noted that under riveting of the edge sections 2, 4 is understood not only a rivet joint per se, but that all joints formed by frictional forces, interlocking shapes and/or material bonds are included, such as those using screws, pins, welding or brazing.

It should further be noted that it is also conceivable not only to manufacture the nozzle tip 44 of the injection nozzle 30, 32 from an elastic rubber material, but the complete region of the nozzle projecting from the tool 28. This has the advantage that the injection nozzle 30, 32, that is to say, the nozzle region, can be deformed per se, so that the introduction of the injection nozzles 30, 32 into the holes is further eased.

Likewise it is possible for the tool 28 to be of elastic design just in the immediate region of the injection nozzles 30, 32. For example, elastic rubber rings can be inserted in the tool, in which the injection nozzles 30, 32 are arranged.

It should further be noted that the tool 28 can be freely selected in terms of its size and number of injection nozzles 30, 32.

Moreover it is also conceivable to form the hole pattern 6 in the radially inner-lying edge section 4.

The injection nozzles 30, 32 can also have an outer diameter $d_A$ that is somewhat larger than the inner diameter $d_I$ of the holes 8, 10, such that the injection nozzles 30, 32 close off the holes 8, 10 immediately upon insertion, i.e. upon positioning of the tool 28.

Likewise it is conceivable that the tool 28 is not positioned at a distance from the outer circumference 38 of the outer edge section 2, but is positioned against the latter.

It should further be noted that the method according to the invention and the tool according to the invention are not limited to the joining of CDRP components, but can be fundamentally applied independently of the material of the components to be joined. Thus, for example, the components can consist of other fibre-reinforced composite materials, such as, for example, a glass fibre-based laminate material such as GLARE®, or a metal alloy.

A method is disclosed for tolerance compensation between two components, wherein the components are brought section-by-section into an overlapping configuration, a filler mass is injected via at least one hole (8, 10) between the components, and the components after hardening of the filler mass are joined together in an overlap joint; also a tool (28) for the execution of a method of this type with at least one injection nozzle (30, 32), which can be inserted into the hole (8, 10) in a sealing manner.

REFERENCE SYMBOL LIST 2 radially outer-lying edge section
4 radially inner-lying edge section
6 hole pattern
8 hole
10 hole
12 hole pair
14 hole pair
16 radial gap
18 axial gap
20 inner circumferential surface
22 outer circumferential surface
24 annular surface
26 annular surface
28 tool
30 injection nozzle
32 injection nozzle
34 flow direction
36 flow direction
38 outer circumference
40 inner circumference
42 annular gap
44 nozzle tip
46 taper
48 end face
$d_A$ outer diameter
$d_I$ inner diameter

What is claimed is:

1. A method for tolerance compensation in an overlap joint between a first and a second body section of adjacent fuselage rings, the method comprising:
   introducing a plurality of holes into a first body section corresponding to a pattern of rivets;
   arranging the first and second body section in an overlapping configuration so as to form an overlap;
   injecting a filler mass through the plurality of holes into a gap formed in the overlap; and
   hardening the filler mass,
   wherein the injecting includes closing off and covering the plurality of holes with a tool, and
   wherein the tool improves a sealing action of the holes and increases a pressure during the injecting.

2. The method as recited in claim 1, wherein the injecting includes injecting the filler mass through each of the plurality of holes at the same time.

3. The method as recited in claim 1, wherein the overlap includes an axial gap and a radial gap, and the method further comprises:
   closing at least one of the axial gap and an end face opening of the radial gap with a porous-to-air adhesive tape.

4. The method as recited in claim 3, wherein the closing comprises closing the axial gap with a porous-to-air adhesive tape.

5. The method as recited in claim 3, wherein the closing comprises closing the end face opening with a porous-to-air adhesive tape.

6. The method as recited in claim 3, wherein the closing comprises closing the axial gap and the end the opening of the radial gap with a porous-to-air adhesive tape.

7. The method as recited in claim 1, wherein the filler mass is compressed during the injection.

8. The method as recited in claim 1, wherein the tool comprises a plurality of nozzles, and the method further comprises:
   moving the nozzles relative to one another.

9. The method as recited in claim 1, wherein the first body section comprises a carbon-fiber reinforced material.

10. The method as recited in claim 1, wherein the second body section comprises a carbon-fiber reinforced material.

11. The method as recited in claim 10, wherein the first body section comprises a metal alloy.

12. The method as recited in claim 10, wherein the first body section comprises a glass-fiber laminate.

13. The method as recited in claim 1, wherein the first and second body section comprise a carbon-fiber reinforced material.

14. The method as recited in claim 1, wherein the first body section comprises a metal alloy.

15. The method as recited in claim 14, wherein the first body section comprises a glass-fiber laminate.

16. The method as recited in claim 1, wherein the first body section comprises a glass-fiber laminate.

17. The method as recited in claim 1, wherein the injecting consists essentially of injecting the filler mass under pressure.

* * * * *

UNITED STATES PATENT AND TRADEMARK OFFICE
CERTIFICATE OF CORRECTION

PATENT NO. : 8,438,717 B2  
APPLICATION NO. : 12/729392  
DATED : May 14, 2013  
INVENTOR(S) : Eugen Gorr et al.

Page 1 of 1

It is certified that error appears in the above-identified patent and that said Letters Patent is hereby corrected as shown below:

Please insert onto the Title page of U.S. Patent No. 8,438,717, after item (65), and before item (51), the following:

-- Related U.S. Application Data  
(60) Provisional application No. 61/163,050, filed on Mar. 25, 2009.

(30)             Foreign application Priority Data  
Mar. 25, 2009     (DE) ............................... 10 2009 014 933 --

Signed and Sealed this  
Ninth Day of July, 2013

Teresa Stanek Rea  
*Acting Director of the United States Patent and Trademark Office*